United States Patent
Hester et al.

(10) Patent No.: US 6,321,886 B2
(45) Date of Patent: *Nov. 27, 2001

(54) FINAL BALANCED BRAKE DRUM HAVING INTEGRAL SQUEALER BAND AND METHOD FOR PRODUCING SAME

(75) Inventors: Larry B. Hester, Dayton, OH (US); Jay K. Julow, Novi, MI (US); Robert A. DeRegnaucourt, Centerville; John C. Hall, Kettering, both of OH (US)

(73) Assignee: Meritor Heavy Vehicle Technology, LLC

( * ) Notice: Subject to any disclaimer, the term of this patent is extended or adjusted under 35 U.S.C. 154(b) by 0 days.

This patent is subject to a terminal disclaimer.

(21) Appl. No.: 09/849,200

(22) Filed: May 4, 2001

Related U.S. Application Data

(63) Continuation of application No. 09/444,614, filed on Nov. 23, 1999, which is a continuation of application No. 08/773,678, filed on Dec. 24, 1996, now Pat. No. 5,992,581, which is a continuation-in-part of application No. 08/572,227, filed on Dec. 13, 1995, now Pat. No. 5,586,625, which is a division of application No. 08/076,986, filed on Jun. 14, 1993, now Pat. No. 5,483,855.

(51) Int. Cl.$^7$ ............................... F16D 65/10; B23C 3/34
(52) U.S. Cl. ......................................... 188/218 R; 188/78
(58) Field of Search ................................ 188/78, 218 A, 188/218 TZ, 325; 82/1.11, 112, 903; 409/84, 123, 132

(56) References Cited

U.S. PATENT DOCUMENTS

| | | |
|---|---|---|
| 3,817,149 | 6/1974 | Reutlinger . |
| 4,986,149 | 1/1991 | Carmel et al. . |
| 5,352,305 | 10/1994 | Hester . |
| 5,483,855 | 1/1996 | Julow et al. . |
| 5,538,111 | 7/1996 | Gee . |
| 5,586,625 | 12/1996 | Julow et al. . |
| 5,664,648 | 9/1997 | Hester . |
| 5,782,324 | 7/1998 | Wall . |
| 5,992,581 | 11/1999 | Julow et al. . |

OTHER PUBLICATIONS

Micro–poise Model 2897–DPMA Automatic In–Line Transfer Drum Balancing and Mill Correction Machine With LVDT Balance Measurement System, Operation and Maintenance Manual With Parts List, Apr. 1986, pp. i–ii, 1–2 and 11–12, with cover letter of Apr. 27, 2000.

Information Disclosure Statement filed Dec. 31, 1998 (7 pages) during prosecution of 5,992,581.

*Primary Examiner*—Christopher P. Schwartz
(74) *Attorney, Agent, or Firm*—Carlson, Gaskey & Olds

(57) ABSTRACT

An improved method for final balancing a brake drum determines the location and length of a first constant depth cut and a second constant depth cut along the squealer band which are necessary to correct the imbalance, and using a cutting machine, makes the first and second constant depth cuts at the predetermined location and for the predetermined length along the squealer band to produce a final balanced brake drum. Preferably, the cutting machine is a milling machine which produces a plunge type entrance/exit cut. It is a further feature of the invention to provide a feather type entrance/exit cut to reduce the stress concentrations, and produce a cosmetically more appealing final balanced brake drum.

6 Claims, 6 Drawing Sheets

FINAL BALANCED BRAKE DRUM HAVING INTEGRAL SQUEALER BAND AND METHOD FOR PRODUCING SAME

CROSS-REFERENCE TO RELATED APPLICATIONS

This application is a continuation of U.S. Ser. No. 09/444,614, filed Nov. 23, 1999, which is a continuation of U.S. Ser. No. 08/773,678, filed Dec. 24, 1996, U.S. Pat. No. 5,992,581, which is a continuation-in-part of U.S. Ser. No. 08/572,227, filed Dec. 13, 1995, U.S. Pat. No. 5,586,625, which is a divisional of U.S. Ser. No. 08/076,986, filed Jun. 14, 1993, U.S. Pat. No. 5,483,855.

BACKGROUND OF THE INVENTION

This invention relates in general to vehicle brake drums and in particular to an improved final balanced brake drum having an integral squealer band and method for producing the same.

The production of cast metal brake drums for heavy duty vehicles begins with a conventional sand-patterned mold casting operation. After cleaning, the brake drum casting is precision drilled and concentrically machined to predetermined dimensional tolerances. However, at this point, the machined brake drum typically incorporates a sufficient imbalance which renders the brake drum unsatisfactory for use on a vehicle. As a result of this, the brake drum is generally subjected to a "final balancing" operation. Conventionally, this final balancing operation has been achieved by determining the location and amount of the imbalance using a static balancer, and then welding correcting weights to an outer surface of the drum.

Typically, a heavy duty brake drum is provided with an integral raised squealer band. One method which can be used to final balance a brake drum having a squealer band subjects the drum to a final machining operation. According to this method, a static balancer is fist used to determine the location and amount of the imbalance. An operator then marks the location of the imbalance on the squealer band, and transfers the marked drum to a milling machine. The milling machine is operated and flattens off an outer surface of the squealer band at the marked imbalance location to produce a final balanced brake drum.

U.S. Pat. No. 4,986,149 to Carmel et al. discloses another method for correcting the imbalance in a brake drum having an integral squealer band by subjecting the drum to a final machining operation. According to the method of this patent, a static balancer is first used to determine the location and amount of to the imbalance. Then a crescent or wedge or material is preferably cut away from an outer surface of a squealer band of the brake drum by a lathe during an eccentric turning process to produce a final balanced brake drum.

SUMMARY OF THE INVENTION

This invention is an improvement on the method of the above discussed U.S. patent to Carmel et al. The improved method for final balancing a brake drum determines the location and length of a first constant depth cut and a second constant depth cut along the squealer band which are necessary to correct the imbalance, and using a cutting machine, makes the first and second constant depth cuts at the predetermined location and for the predetermined length along the squealer band to produce a final balanced brake drum. Preferably, the cutting machine is a milling machine which produces a plunge type entrance/exit cut. It is a further feature of the invention to provide a feather type entrance/exit cut to reduce the stress concentrations, and produce a cosmetically more appealing final balanced brake drum.

As a result of correcting the imbalance by making the first and second constant depth cuts along the squealer band, a greater imbalance in the brake drum can be corrected compared to the prior art.

Other advantages of this invention will become apparent to those skilled in the art from the following detailed description of the preferred embodiment, when read in light of the accompanying drawing.

DETAILED DESCRIPTION OF THE PREFERRED EMBODIMENTS

Figure 1:
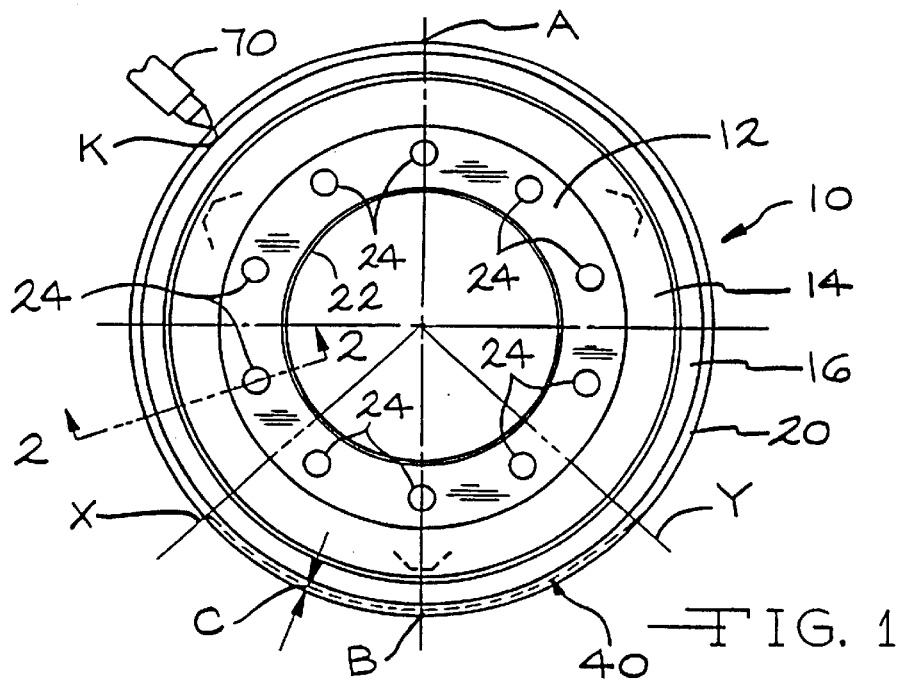
FIG. 1 is a plan view of a first embodiment of a final balanced brake drum constructed in accordance with the present invention.
Figure 2:
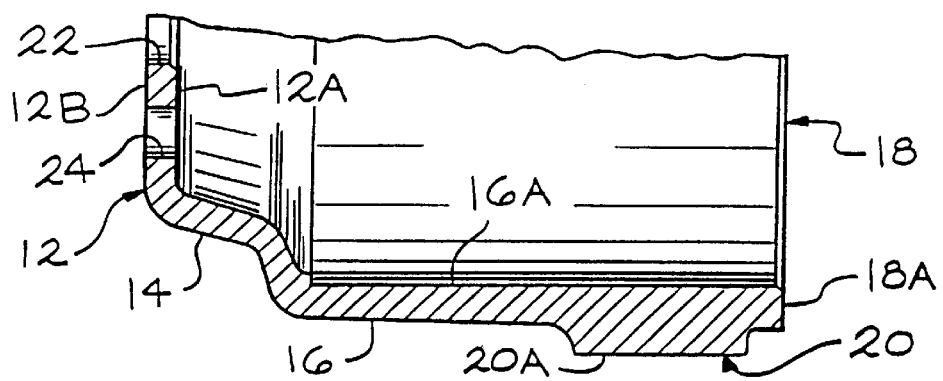
FIG. 2 is a partial cross sectional taken along line 2—2 of FIG. 1.

Referring now to the drawings, there is illustrated in FIG. 1 a first embodiment of a brake drum, indicated generally at 10, constructed in accordance with the present invention. As best shown in FIG. 2, the brake drum 10 includes a generally closed end or annular bolt flange 12, a transition section 14, a generally axially extending cylindrical main body 16, and an opened end 18. The cylindrical body 16 includes a raised continuously extending annular squealer band 20 having an outwardly facing surface 20A.

The brake drum 10 further includes a generally centrally located spindle receiving opening 22 formed therein, and a plurality of holes 24 (10 holes being shown in this embodiment) drilled through the flange 12 and spaced circumferentially about the opening 22. The holes 24 are adapted to receive wheel mounting studs (not shown). The brake drum 10 is typically cast from grey iron, but can be made from other metals.

Once the brake drum is cast, the outwardly facing surface 20A of the squealer band 20, an inner surface 16A of the cylindrical body 16, an inner surface 12A and an outer surface 12B of the flange 12, and an end surface 18A of the opened end 18 are machined to predetermined design dimensions. The brake drum 10 thus far described is conventional in the art.

Turning now to the present invention, the initially machined brake drum 10 typically incorporates a sufficient imbalance such that it cannot be satisfactorily used on a vehicle. This imbalance establishes a light side of the brake drum, and the opposite heavy side. In FIG. 1, the center of the light side is denoted at point A on the outer surface 20A of the squealer band, and the center of the heavy side is denoted at point B on the outer surface 20A of the squealer band 20 and is located 180° from point A. As well will be discussed below, in accordance with the present invention, a predetermined amount of material is removed from the heavy side of the squealer band 20, as shown by a dashed line 40 in FIG. 1 to correct the imbalance and produce a final balanced brake drum 10. As shown in FIG. 1, this material is removed along a predetermined angular section of the squealer band 20 generally defined by lines X and Y.

Figure 7:
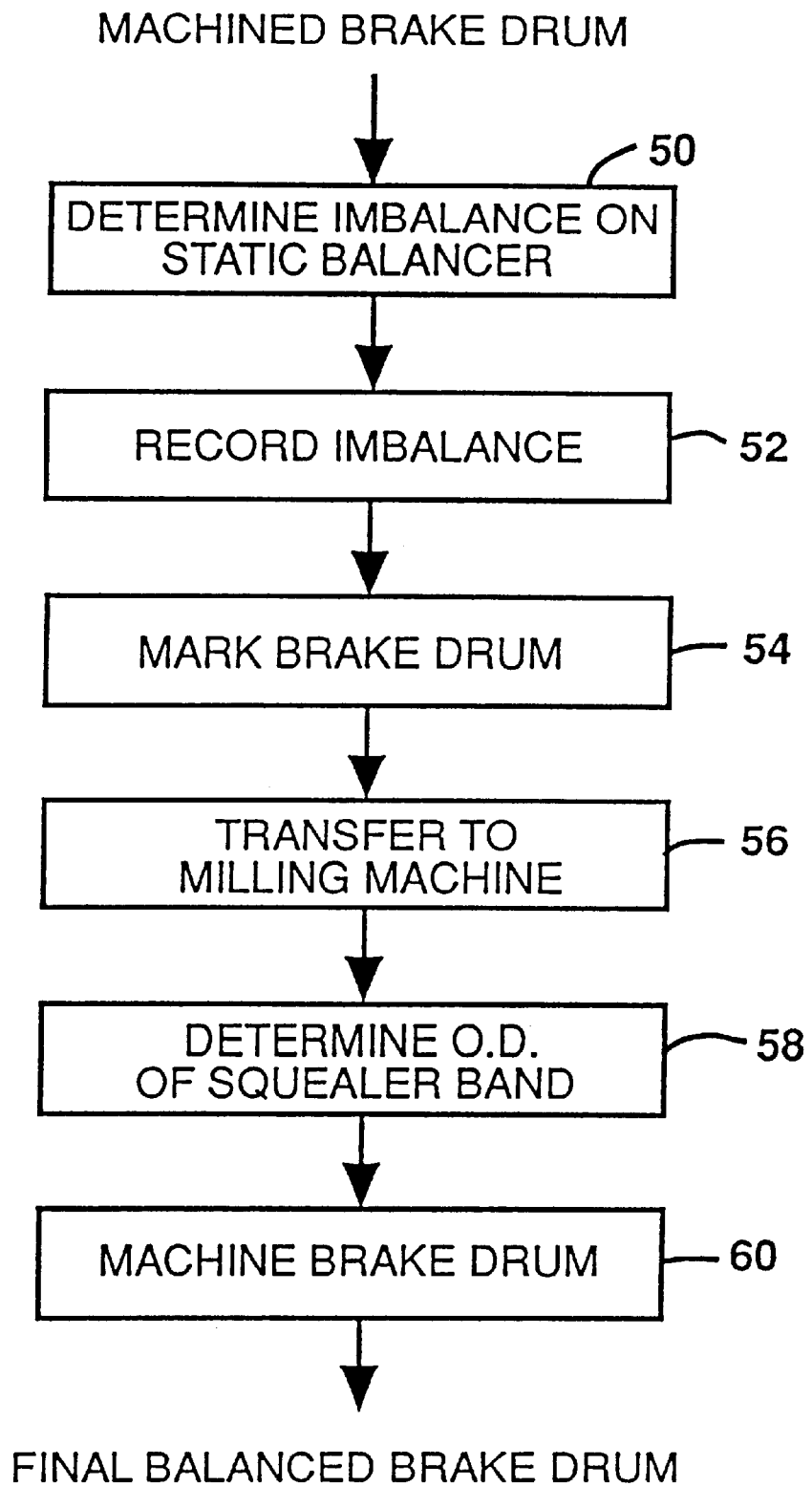
FIG. 7 is a flow diagram illustrating a sequence of steps for producing the brake drum shown in FIG. 1.

Referring now to FIG. 7, a preferred sequence of steps for producing the final balanced brake rum 10 shown in FIG. 1 will be discussed. Initially, in step 50, the initially machined brake drum is positioned and clamped in place on a static balancer (not shown) to determine whether the brake drum has a final balance which is unacceptable. If during step 50 it is determined that the brake drum has an unacceptable imbalance, the angular location of the heavy point of the imbalance (denoted by point B in FIGS. 1 and 3), and the ounce/inch imbalance is recorded relative to a reference mark (denoted by point K in FIG. 1) by a recording device (not shown), such as a computer, which is integrated with the static balancer in step 52.

As will be discussed, the reference mark K is needed in instances where the brake drum is manually transferred from the static balancer to a milling machine (not shown). If the static balancer is incorporated with the milling machine, if the brake drum is manually or automatically transferred to the milling machine without rotating it from the position which it was located on the static balancer, or if a fully automated transfer system includes means for orienting the drum on the filling machine in a predetermined position, the reference mark K may be omitted.

Next, in this embodiment, prior to removing the brake drum from the static balancer, the reference mark K is applied to an outer surface of the brake drum in step 54 by a marking device 70. The marking device 70 is fixed relative to a static balancer, and as will be discussed below, the reference mark K applied by the marking device 70 provides a mark on the brake drum which is later used for positioning purposes when transferring the brake drum to the milling machine. Preferably, the reference mark K is automatically applied to the outer surface of the brake drum by the marking device 70. The marked brake drum is then removed from the static balancer and transferred to the milling machine in step 56.

The milling machine is integrated with the computer which recorded the imbalance location B (relative to reference mark K) and the amount of the ounce/inch imbalance of the brake drum. During step 56, the marked brake drum is positioned and clamped in place with the reference mark K on the drum aligned with a corresponding reference mark (not shown) provided on the milling machine.

Figure 6:
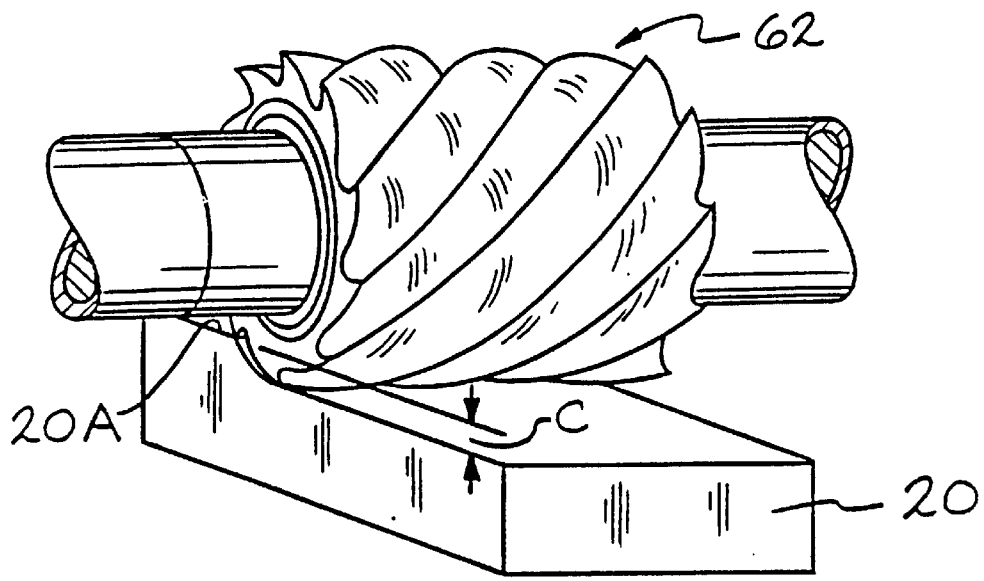
FIG. 6 is a schematic view showing a milling machine which is operative to produce the final balanced brake drum shown in FIG. 1.

Once the brake drum is properly positioned on the milling machine, the brake drum is rotated to a predetermined position calculated by the computer. Next, during step 58, a measuring device (not shown) measures the precise outer diameter of the squealer band 20 near the imbalance point B, and transfers this measurement to the computer. Using the stored data from step 52 and the precise outer diameter of the squealer band of the corresponding brake drum from step 58, the computer determines a constant depth cut and a length thereof along the squealer band 20 which is necessary to correct the measured imbalance of the drum. Finally, in step 60, the milling machine is operated and via a control signal supplied by the computer, removes a predetermined amount of material from an outer surface 20A of the squealer band 20 to produce the final balanced brake drum 10. As will be discussed below, to accomplish this, the milling machine includes a mill cutter 62, such as shown in FIG. 6, which is operative to make the cut 40 during step 60 which extends into the outer surface 20A of the squealer band 20 and continues into the surface 20A until a predetermined full depth dimension C is reached.

Figure 3:
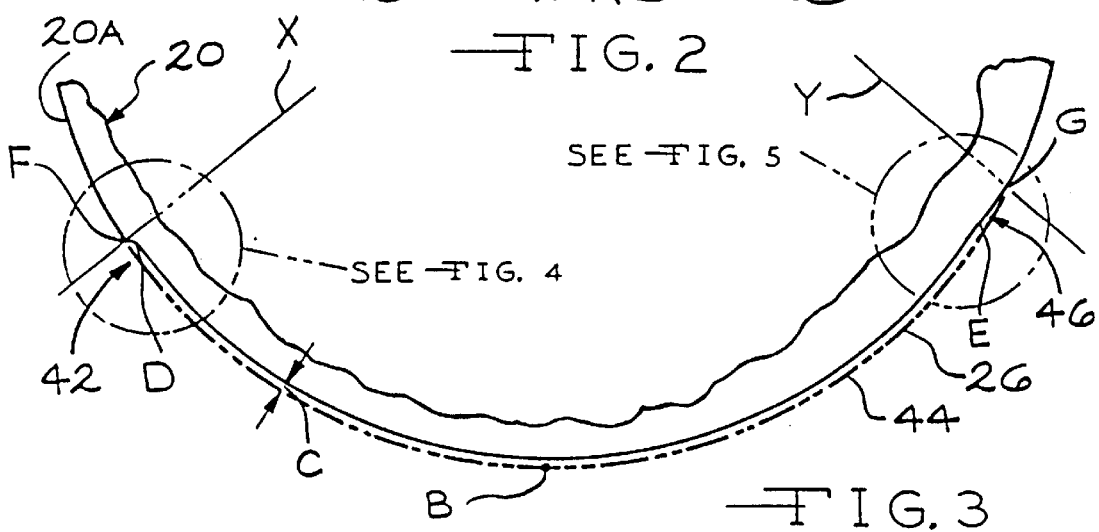
FIG. 3 is an enlarged plan view of a lower portion of the brake drum shown in FIG. 1, and showing a balance cut provided therein.

Turning now to FIG. 3, there is illustrated an enlarged lower portion of the brake drum 10 shown in FIG. 1, having the predetermined amount of material removed from the squealer band 20 by the cut 40 to correct the imbalance. As shown therein, the cut 40 consists of an entrance portion 42, a constant depth arc-shaped sweep cut portion 44, and an exit portion 46.

While both the entrance and exit portions 42 and 46, respectively, used to correct the imbalance of an individual brake drum are the same, for discussion purposes two different ways of forming the entrance and exit portions of the cut 40 are shown in FIG. 3. The entrance cut portion 42, shown more clearly in FIG. 4, defines a plunge type cut. The exit cut portion 46, shown more clearly in FIG. 5, defines a feather type cut.

The generally constant depth cut 44 made in the outer surface 20A of the squealer band 20 extends from a point D to a point E. Also, in FIG. 3, the original contour of the imbalanced brake drum squealer band prior to the cut 40 being made therein is represented by a dashed line 26.

Figure 4:
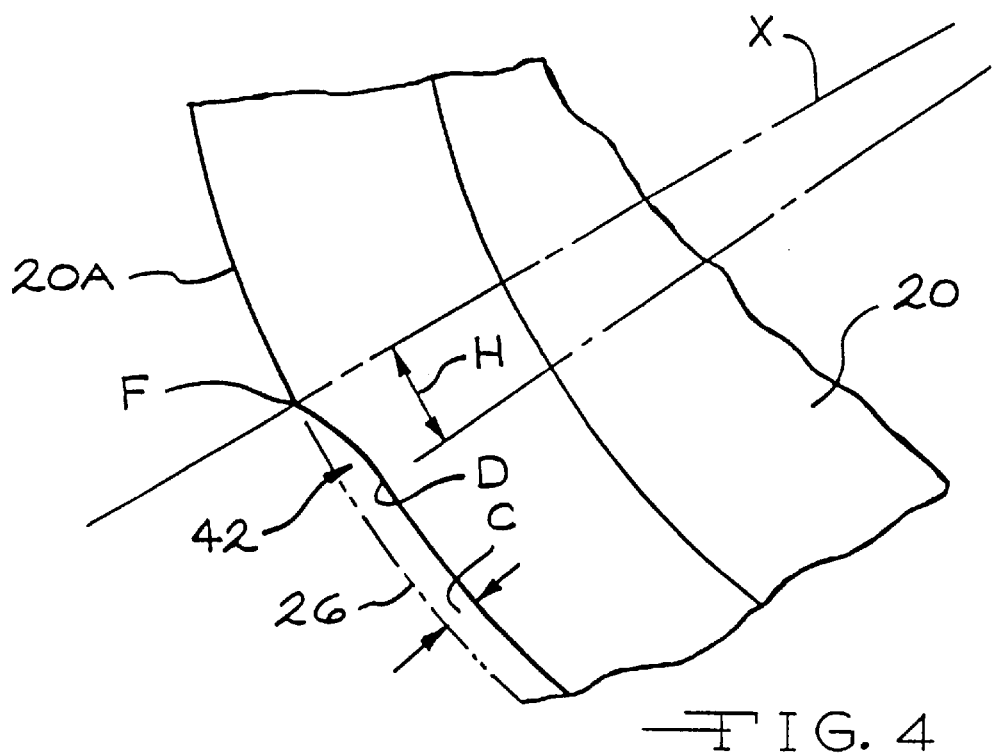
FIG. 4 is a enlarged detailed view of a left hand portion of FIG. 3, and illustrating one version of an entrance/exit cut.

Turning now to FIG. 4, the plunge type entrance cut made by the mill cutter 62 of the milling machine during step 60 extends into the outer surface 20A of the squealer band 20 starting at a point F, and continues into the outer surface 20A of the squealer band 20 until a predetermined full depth dimension C is reached at point D. Once the full depth dimension C is reached, the mill cutter 62 of the milling machine is operative to make the constant depth arc-shaped sweep cut along the squealer band 20 for a predetermined length defined between points D and E. At point E, an exit cut, shown in FIG. 5 as being the preferred feather type cut, is made from the constant depth cut at point G. For comparison purposes, a plunge type exit cut (from point E to F) is shown in FIG. 5 by a dashed line 48.

Figure 5:
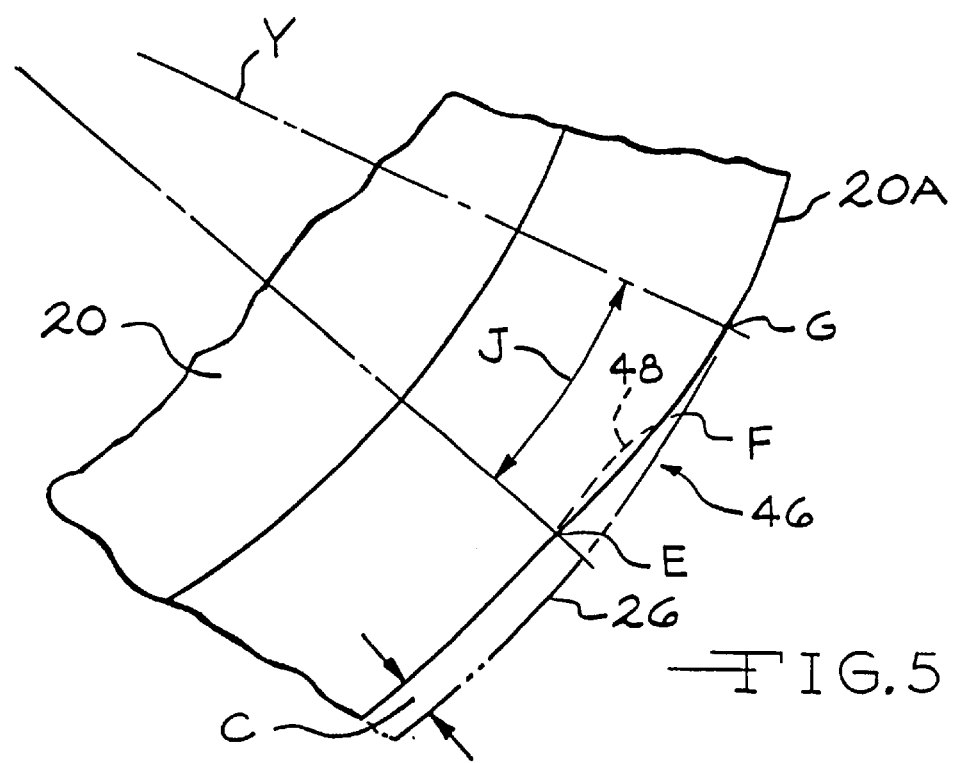
FIG. 5 is a enlarged detailed view of a right hand portion of FIG. 3 and illustrating an alternate and preferred version of the entrance/exit cut.

Comparing the plunge type cut from points F to D shown in FIG. 4 to the feather type cut from points E to G shown in FIG. 5, the plunge reaches the full depth dimension C in an angle H, and the feather cut reaches the same full depth dimension C in an angle J which is greater than the angle H. As a result of this, it is apparent that the start of the feather cut at point G into the outer surface 20A of the squealer band 20 occurs before the start of the plunge cut at point F into the squealer band outer surface 20A. Regardless of the particular type of entrance and exit cuts which are used, the beginning and ending points for the constant depth cut 44 defined by points D and E, are located generally equidistant relative to point B.

Figure 11:
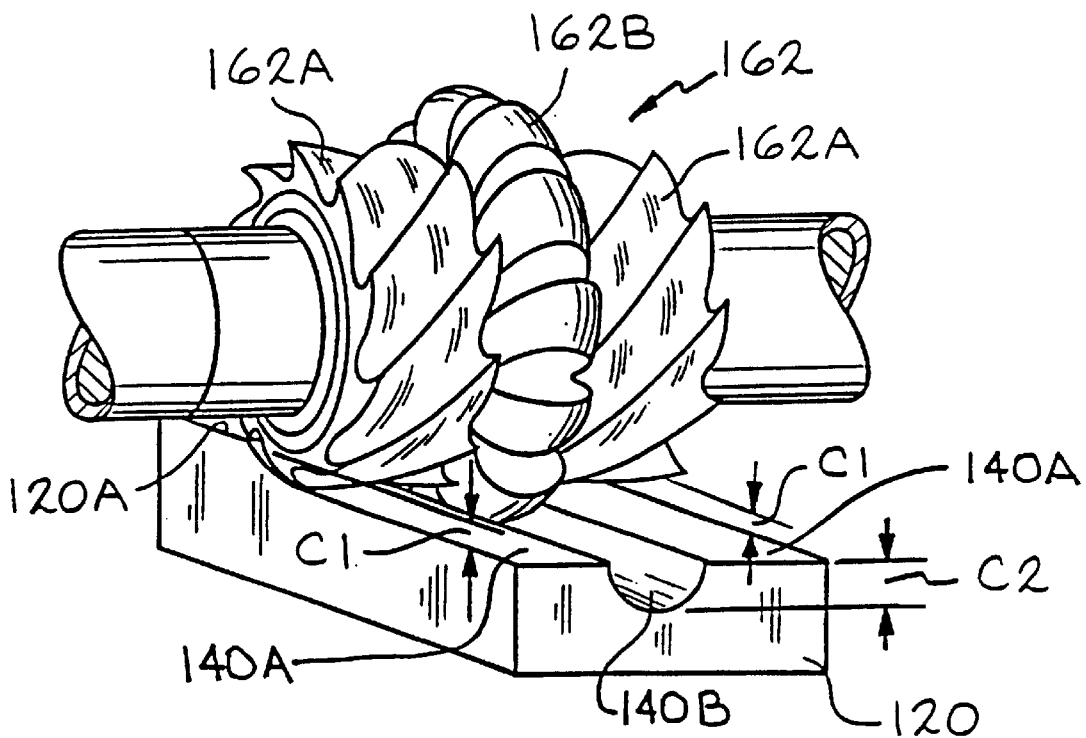
FIG. 11 is a schematic view showing a milling machine which is operative to produce the final balanced brake drum shown in FIG. 8.
Figure 8:
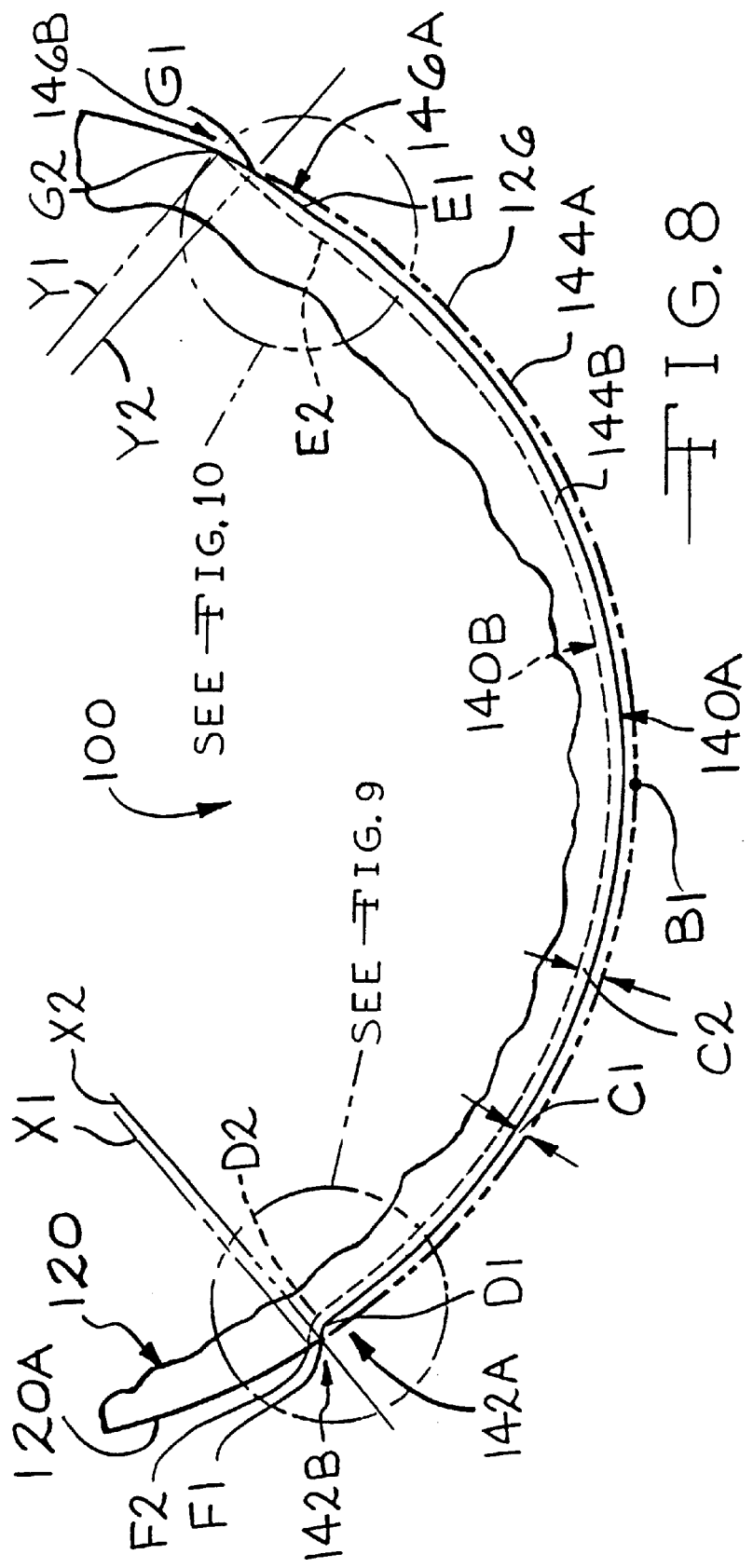
FIG. 8 is an enlarged plan view of a lower portion of a second embodiment of a final balanced brake drum, and showing a balance cut provided therein.

Turning now to FIG. 8, there is illustrated an enlarged lower portion of a second embodiment of a brake drum, indicated generally at 100, constructed in accordance with this invention. As shown therein, the brake drum 100 has a predetermined amount of material removed from an outer surface 120A of a squealer band 120 by a mill cutter 162 of a milling machine shown in FIG. 11.

The mill cutter 162 includes a pair of outer mill cutters 162A which are illustrated as being identical to one another, and a center mill cutter 162B. The outer mill cutters 162A are operative to make a pair of spaced apart of outer cuts 140A which extend into the outer surface 120A of the squealer band 120 and continue into the outer surface 120A until a respective predetermined full depth dimension C1 is reached. The outer cuts 140A remove a predetermined amount of material from the outer surface 120A of the squealer band 120 along a predetermined angular sections of the squealer band 120 generally defined between lines X2 and Y2.

The center mill cutter 162B is operative to make a center cut 140B which extends into the outer surface 120A of the squealer band 120 and continues into the surface 120A until a predetermined full depth dimension C2 is reached. The center cut 140B removes a predetermined amount of material from the outer surface 120A of the squealer band 120 along a predetermined angular section of the squealer band 120 generally defined between lines X1 and Y1. In the preferred embodiment, the full depth dimension C2 is greater than the full depth dimension C1. However, the full depth dimensions C1 and C2 may be different as desired, and/or the outer mill cutters 162 may be different from one another as desired. Also, for discussion purposes, since the outer mill cutters 162A are effective to produce similar outer cuts 140A in the squealer band 120A of the brake drum 100, only one of the outer cuts 140A is shown in FIGS. 8, 9, and 10 and will be discussed.

The outer cut 140A consists of an entrance portion 142A, a constant depth arc-shaped sweep cut portion 144A, and an exit portion 146A. The center cut 140B consists of an entrance portion 142B, a constant depth arc-shaped sweep cut portion 144B, and an exit portion 146B. While both the outer entrance portion 142A and the outer exit portion 146A are the same, and the center entrance portion 142B and the center exit portion 146B are the same, for discussion purposes two different ways of forming the associated entrance and exit portions of the respective cuts 140A and 140B are shown in FIG. 8.

Figure 9:
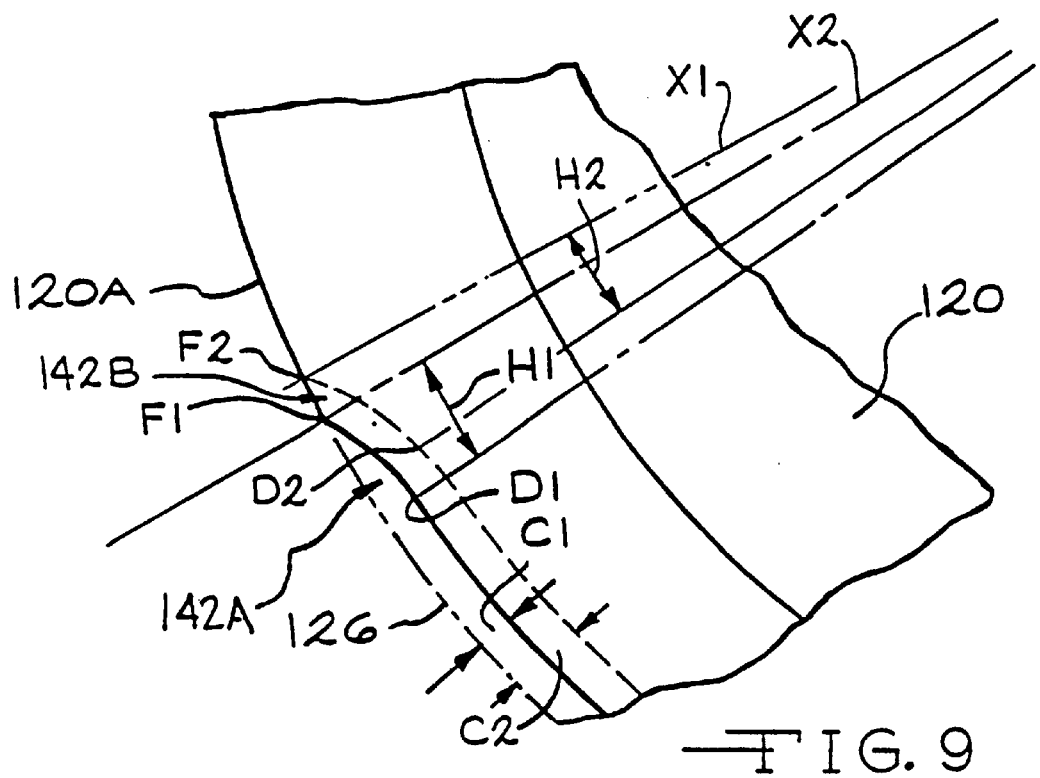
FIG. 9 is a enlarged detailed view of a left hand portion of FIG. 8, and illustrating one version of an entrance/exit cut.
Figure 10:
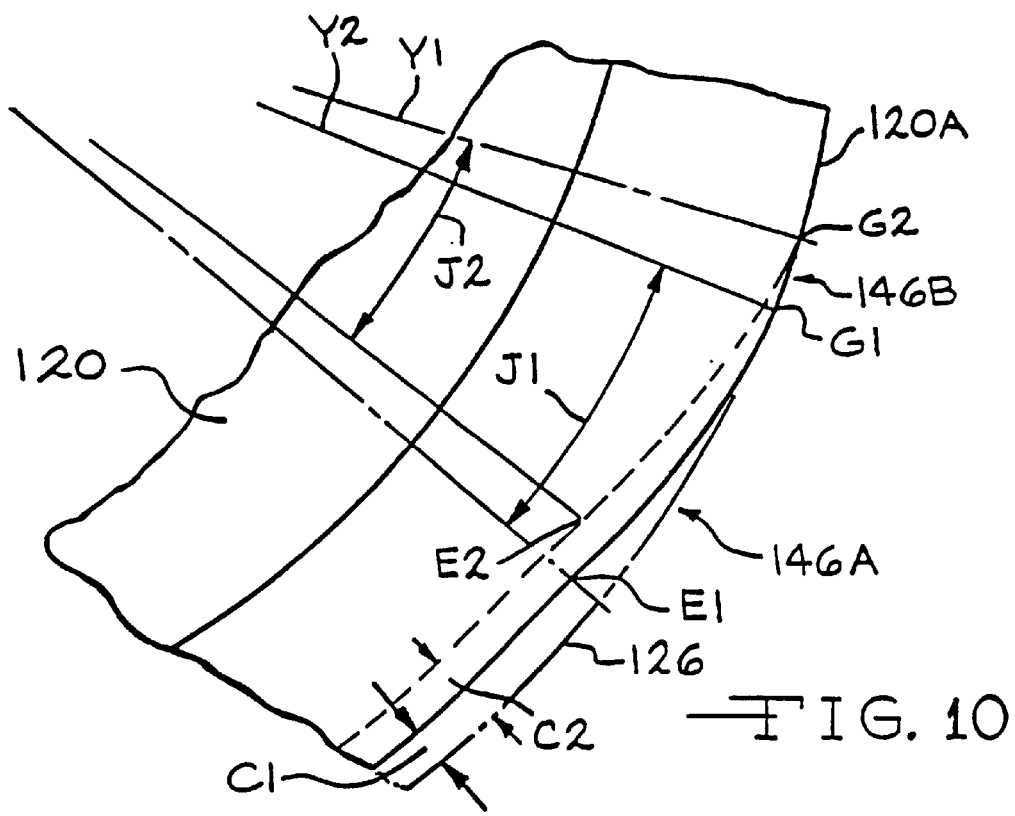
FIG. 10 is a enlarged detailed view of a right hand portion of FIG. 8 and illustrating an alternate and preferred version of the entrance/exit cut.

The outer entrance cut portion 142A and the center entrance cut portion 142B, shown more clearly in FIG. 9, define a plunge type cut. The outer exit cut portion 146A and the center exit cut portion 146B, shown more clearly in FIG. 10, define a feather type cut.

The generally constant depth outer cut 144A made in the outer surface 120A of the squealer band 120 extends from a point D1 to a point E1. The generally constant depth center cut 144B made in the outer surface 120A of the squealer band 120 extends from a point D2 to a point E2. Also, in FIGS. 8, 9, and 10, the original contour of the imbalanced brake drum squealer band prior to the cuts 140A and 140B being made therein is represented by a dashed line 126.

Turning now to FIG. 9, the plunge type outer entrance cut 142A made by the outer mill cutter 162A of the milling machine extends into the outer surface 120A of the squealer band 120 starting at a point F1, and continues into the surface 120A of the squealer band 120 until a predetermined full depth dimension C1 is reached at point D1. Once the full depth dimension C1 is reached, the outer mill cutter 162A of the milling machine is operative to make the constant depth arc-shaped sweep cut 144A along the squealer band 120 for a predetermined length defined between points D1 and E1. At point E1, the outer exit cut 146A, shown in FIG. 10 as being the preferred feather type cut, is made from the constant depth cut 144A at point G1.

The plunge type center entrance cut 142B made by the center mill cutter 162B of the milling machine extends into the outer surface 120A of the squealer band 120 starting at a point F2, and continues into the surface 120A of the squealer band 120 until a predetermined full depth dimension C2 is reached at point D2. Once the full depth dimension C2 is reached, the center mill cutter 162B of the milling machine is operative to make the constant depth arc-shaped sweep cut 144B along the squealer band 120 for a predetermined length defined between points D2 and E2. At point E2, the center exit cut 146B, shown in FIG. as being the preferred feather type cut, is made from the constant depth cut 144B at point G2.

Comparing the outer plunge type cut 142A from points F1 to D1 shown in FIG. 9 to the outer feather type cut 146A from points E1 to G1 shown in FIG. 10, the outer plunge cut 142A reaches the full depth dimension C1 in an angle H1, and the outer feather cut 146A reaches the same full depth dimension C1 in an angle J1 which is greater than the angle H1. As a result of this, it is apparent that the start of the outer feather cut 146A at point G1 into the outer surface 120A of the squealer band 120 occurs before the start of the outer plunge cut 142A at point F1 into the squealer band outer surface 120A. Regardless of the particular type of outer entrance and exit cuts which are used, the beginning and ending points for the constant depth cut C1 defined by points D1 and E1 are located generally equidistant relative to point B1.

Comparing the center plunge type cut 142B from points F2 to D2 shown in FIG. 9 to the center feather type cut 146B from points E2 to G2 shown in FIG. 10, the center plunge cut 142B reaches the full depth dimension C2 in an angle H2, and the center feather cut 146B reaches the same full depth dimension C2 in an angle J2 which is greater than the angle H2. As a result of this, it is apparent that the start of the center feather cut 146B at point G2 into the outer surface 120A of the squealer band 120 occurs before the start of the center plunge cut 142B at point F2 into the squealer band outer surface 120A. Regardless of the particular type of center entrance and exit cuts which are used, the begin ning and ending points for the constant depth cut C2 defined by points D2 and E2 are located generally equidistant relative to point B1.

As discussed above, the entrance and exit cuts are preferably feather type cuts rather than plunge type cuts. The feather type cuts provide a smooth transition down to the constant depth cut and back to the outer surface of the brake drum as compared to the plunge type cuts. As a result of this, the feather type cuts provide a smooth transition down to the constant depth cut and back to the outer surface of the brake drum as compared to the plunge type cuts. As a result of this, the feather type cuts reduce the stress concentrations formed in the final balanced brake as compared to the plunge type cuts. Also, the smooth transition of the feather type cuts results in a better looking final balanced brake drum as compared to the plunge type cuts.

The preferred feather type entrance and exit cuts are at a constant slope rate of approximately 0.005 inches per degree of rotation of the associated brake drum until the respective predetermined constant depths C, C1, and C2 are reached. In addition, regardless of the type of entrance and exit cuts which are made by the associated mill cutters 62, 162A, and 162B of the respective milling machine, the preferred maximum dimension of the associated constant depth cut is approximately 0.060 inches, and the preferred length of the associated constant depth cut is calculated using a maximum angle between points D and E, and D2 and E2 of approximately 120 degrees. However, since all of these figures depend upon the particular amount of imbalance which needs to be corrected, and the particular diameter of the corresponding brake drum (relative to the machined inner diameter), the actual figures necessary to correct the imbalance can be different from those discussed above.

One advantage of the present invention is that the constant depth cuts 44, 144A, and 144B from points D to E, D1 to E1, and D2 to E2, respectively, can correct a greater imbalance in the brake drum in a shorter length along the associated squealer band of the brake drum compared to the prior art balance methods. Also, the cycle time to final balance a brake drum according to the present invention is substantially less compared to the cycle time of the prior art balance methods.

Although this invention has been illustrated and described in connection with the particular mill cutters disclosed herein, other mill cutter shapes and/or arrangements of mill cutters can be used. For example, the center mill cutter 162B could have a shape similar to that of the other mill cutters. Also, the center mill cutter 162B could be separate from the outer mill cutters 162A, and/or the length of the respective cuts 140A and 140B may be different from one another.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A final balanced brake drum comprising:
    a body having a generally axially extending body, and an opened end, said body provided with an integral raised squealer band, said squealer band having an outwardly facing surface, said brake drum initially incorporates an unacceptable imbalance;
    wherein said squealer band being machined to produce a circumferentially extending substantially constant depth cut along said squealer band which is effective to correct the imbalance.

2. The final balanced brake drum defined in claim 1 wherein said outwardly facing surface is initially machined around its entire circumference.

3. The final balanced brake drum defined in claim 1 wherein said constant depth cut includes a feathered entrance cut at one end of said constant depth cut, and a feathered exit cut at an opposite end of said constant depth cut.

4. The final balanced brake drum defined in claim 1 wherein said constant depth cut includes a plunge entrance cut at one end of said constant depth cut, and a plunge exit cut at an opposite end of said constant depth cut.

5. The final balanced brake drum defined in claim 1 wherein said cut extends substantially across an entire width of said squealer band.

6. The final balanced brake drum defined in claim 1 wherein said cut is generally in the center of said squealer band between spaced apart perimeter edges defining said outwardly facing surface.

* * * * *